(12) United States Patent
Harada et al.

(10) Patent No.: US 9,728,778 B2
(45) Date of Patent: Aug. 8, 2017

(54) NEGATIVE ELECTRODE ACTIVE MATERIAL CONTAINING A TITANIUM OXIDE COMPOUND HAVING A CRYSTAL STRUCTURE OF MONOCLINIC SYSTEM TITANIUM DIOXIDE

(75) Inventors: Yasuhiro Harada, Yokohama (JP); Norio Takami, Yokohama (JP); Hiroki Inagaki, Kawasaki (JP); Keigo Hoshina, Yokohama (JP); Yuki Otani, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 555 days.

(21) Appl. No.: 12/862,118

(22) Filed: Aug. 24, 2010

(65) Prior Publication Data

US 2011/0052994 A1    Mar. 3, 2011

(30) Foreign Application Priority Data

Aug. 25, 2009    (JP) ................................ 2009-194546

(51) Int. Cl.
| | | |
|---|---|---|
| H01M 4/48 | (2010.01) | |
| H01M 10/05 | (2010.01) | |
| H01M 4/485 | (2010.01) | |
| C01G 23/00 | (2006.01) | |
| C01G 23/047 | (2006.01) | |

(Continued)

(52) U.S. Cl.
CPC .......... *H01M 4/485* (2013.01); *C01G 23/001* (2013.01); *C01G 23/005* (2013.01); *C01G 23/006* (2013.01); *C01G 23/047* (2013.01); *C01G 45/00* (2013.01); *C01G 51/00* (2013.01); *H01B 1/08* (2013.01); *C01P 2002/72* (2013.01); *C01P 2002/74* (2013.01); *C01P 2002/76* (2013.01); *C01P 2002/77* (2013.01); *C01P 2004/54* (2013.01); *C01P 2006/40* (2013.01); *H01M 10/052* (2013.01); *Y10T 428/2982* (2015.01)

(58) Field of Classification Search
CPC ........................... H01M 4/485; H01M 10/052
See application file for complete search history.

(56) References Cited

U.S. PATENT DOCUMENTS

| | | |
|---|---|---|
| 2003/0082448 A1 | 5/2003 | Cho et al. |
| 2009/0053605 A1 | 2/2009 | Harada et al. |
| 2009/0081534 A1* | 3/2009 | Takami et al. ................ 429/149 |

FOREIGN PATENT DOCUMENTS

| | | |
|---|---|---|
| JP | 2003-7299 A | 1/2003 |
| JP | 2004-206945 | 7/2004 |

(Continued)

OTHER PUBLICATIONS

English Translation of JP 2008-059980.*

(Continued)

*Primary Examiner* — Ula C Ruddock
*Assistant Examiner* — Frank Chernow
(74) *Attorney, Agent, or Firm* — Oblon, McClelland, Maier & Neustadt, L.L.P.

(57) ABSTRACT

A negative electrode active material according to one embodiment includes a titanium oxide compound having a crystal structure of monoclinic system titanium dioxide. The titanium oxide compound is modified by at least one kind of ion selected from the group consisting of an alkali metal cation, an alkali earth metal cation, a transition metal cation, a sulfide ion, a sulfuric acid ion and a chloride ion.

13 Claims, 5 Drawing Sheets

(51) Int. Cl.
*C01G 45/00* (2006.01)
*C01G 51/00* (2006.01)
*H01B 1/08* (2006.01)
H01M 10/052 (2010.01)

(56) References Cited

FOREIGN PATENT DOCUMENTS

| | | |
|---|---|---|
| JP | 2008-34368 | 2/2008 |
| JP | 2008-59980 | 3/2008 |
| JP | 2008-117625 | 5/2008 |
| JP | 2008-124012 | 5/2008 |
| JP | 4582990 | 11/2010 |
| WO | WO 2010/110035 A1 | 9/2010 |

OTHER PUBLICATIONS

Rene Marchand, et al., "TiO$_2$(B) a New Form of Titanium Dioxide and the Potassium Octatitanate K$_2$Ti$_8$O$_{17}$", Material Research Bulletin, vol. 15, No. 8, 1980, pp. 1129-1133.
U.S. Appl. No. 13/197,303, filed Aug. 3, 2011, Harada, et al.
U.S. Appl. No. 13/238,415, filed Sep. 21, 2011, Harada, et al.
U.S. Appl. No. 12/850,160, filed Aug. 4, 2010, Inagaki, et al.
U.S. Appl. No. 13/053,865, filed Mar. 22, 2011, Inagaki, et al.
U.S. Appl. No. 13/053,913, filed Mar. 22, 2011, Inagaki, et al.
Japanese Office Action mailed on Jun. 4, 2013 in corresponding Japanese Patent Application No. 2009-194546 with English translation, 5 pp.
Japanese Prior Art Document List issued Jan. 9, 2014, in Japan Patent Application No. 2009-194546 (with English translation).
Office Action issued on May 13, 2014 in the corresponding Japanese Patent Application No. 2009-194546 (with English Translation).

\* cited by examiner

NEGATIVE ELECTRODE ACTIVE MATERIAL CONTAINING A TITANIUM OXIDE COMPOUND HAVING A CRYSTAL STRUCTURE OF MONOCLINIC SYSTEM TITANIUM DIOXIDE

CROSS-REFERENCE TO RELATED APPLICATIONS

This application is based upon and claims the benefit of priority from Japanese Patent Application No. 2009-194546, filed Aug. 25, 2009; the entire contents of which are incorporated herein by reference.

FIELD

Embodiments described herein relate generally to a nonaqueous electrolyte battery, active material for battery, method for manufacturing the same and battery.

BACKGROUND

A nonaqueous electrolyte battery using titanium oxide in a negative electrode enables stable and rapid charge/discharge and has a longer life than batteries using a carbon negative electrode. However, titanium oxide has a higher potential (namely, nobler) with respect to metal lithium than carbonaceous materials. In addition, the titanium oxide has a low capacity per unit weight. Therefore, a battery using titanium oxide in the negative electrode has a low energy density.

Because the potential of titanium oxide is caused by a redox reaction between $Ti^{3+}$ and $Ti^{4+}$ when lithium is electrochemically inserted and released, it is electrochemically limited. It is substantially difficult to improve energy density by shifting the potential of the electrode to the lower side also from the fact that rapid charge and discharge can be stably carried out at a higher electrode potential as high as about 1.5 V.

The theoretical capacity of titanium oxide is about 165 mAh/g in the case of titanium oxide having an anatase structure and about 170 mAh/g in the case of lithium-titanium composite oxide having a spinel structure such as $Li_4Ti_5O_{12}$. On the contrary, the theoretical capacity of a graphite material is 385 mAh/g or more. Titanium oxide has a significantly lower capacity density than a carbon negative electrode. This is due to a drop in substantial capacity because of a few sites to which lithium is inserted in the crystal structure of titanium oxide and lithium is easily stabilized in the structure.

In recent years, monoclinic titanium dioxide having a higher theoretical capacity than other titanium oxides has attracted remarkable attention (see, for example, R. Marchand, L. Brohan, M. Tournoux, Material Research Bulletin 15, 1129 [1980]). In monoclinic titanium dioxide, the number of lithium ions which can be inserted or released per one titanium ion is a maximum of 1.0. Therefore, monoclinic titanium oxide has a theoretical capacity as high as about 330 mAh/g.

For example, JP-A 2008-34368 discloses lithium ion storage battery using titanium oxide $TiO_2$ having a bronze structure as a negative electrode active material. Further, JP-A 2008-117625 discloses a lithium secondary battery using, as an active material, titanium dioxide having a titanic acid bronze crystal structure.

However, when monoclinic titanium dioxide is used as an electrode material, there is a problem that a deterioration in the performance of the battery is significant and the life of the battery is shortened.

DETAILED DESCRIPTION

Figure 1:
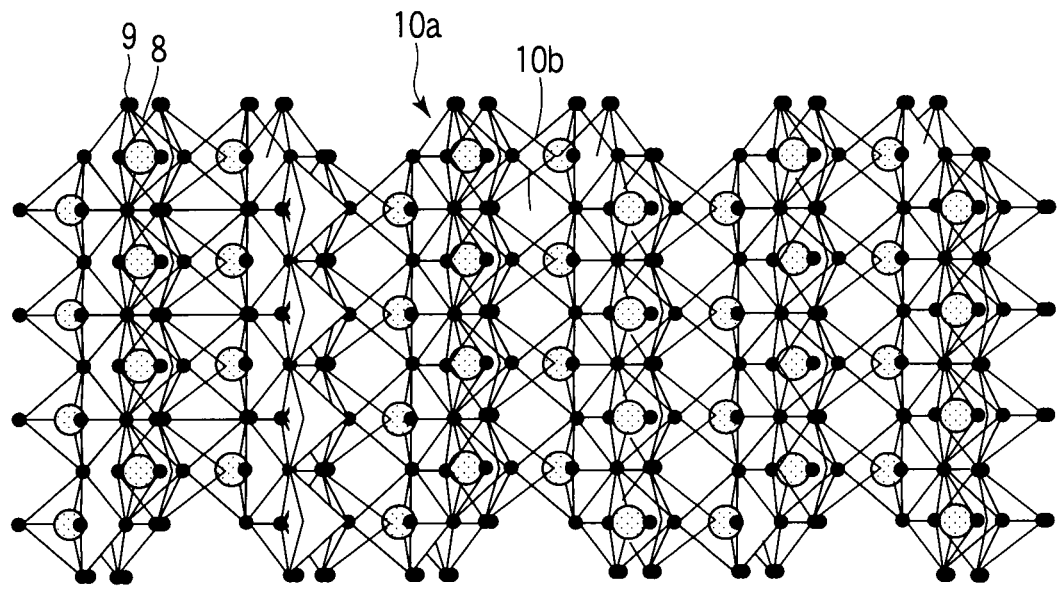
FIG. 1 is a schematic diagram of a crystal structure of monoclinic titanium dioxide.

A negative electrode active material according to one of embodiments includes a titanium oxide compound which has a crystal structure of monoclinic titanium oxide. The titanium oxide compound is modified using at least one kind of ion selected from the group consisting of an alkali metal cation, alkali earth metal cation, transition metal cation, sulfide ion, sulfuric acid ion and chloride ion.

It is preferable that the alkali metal cation is selected from the group consisting of ions of a Li element, Na element and K element, the alkali earth metal cation is selected from the group consisting of ions of a Mg element and Ca element and the transition metal cation is selected from the group consisting of ions of a Mn element, Co element and Cu element. It is more preferable that the alkali metal cation is selected from $Li^+$, $Na^+$ and $K^+$, the alkali earth metal cation is selected from $Mg^{+2}$ and $Ca^{2+}$ and the transition metal cation is selected from a $Mn^{3+}$, $Co^{2+}$ and $Cu^{2+}$.

A method for manufacturing the negative electrode active material according to the other of embodiments includes a step of reacting an alkali titanate compound with an acid to exchange an alkali cation comprised in the alkali titanate compound for a proton, thereby obtaining a proton-exchanged sample, a step of heating the proton-exchanged sample to produce a titanium oxide compound having a crystal structure of monoclinic titanium dioxide and a step of modifying the titanium oxide compound by using at least one kind of ion selected from the group consisting of an alkali metal cation, alkali earth metal cation, transition metal cation, sulfide ion, sulfuric acid ion and chloride ion.

A nonaqueous electrolyte battery according to the other of embodiments includes a positive electrode which lithium can be inserted to and released from, a negative electrode comprising the above negative electrode active material and a nonaqueous electrolyte.

A battery pack according to the other of embodiments includes the above nonaqueous electrolyte battery.

Monoclinic titanium dioxide has a highly reactive solid acid point, for example, a hydroxyl group ($OH^-$) and hydroxyl group radical (OH.) on its surface and acts as a solid catalyst. For this, when monoclinic titanium oxide is used as an electrode material, it is highly reactive to a nonaqueous electrolyte. In a battery using titanium dioxide having an anatase structure and lithium titanate having a spinel structure, these compounds react with the nonaqueous electrolyte to form a stable coating film and therefore, the activity of the surface of the electrode is limited. However, monoclinic titanium dioxide has high catalytic ability, it reacts with the nonaqueous electrolyte after the coating film is formed. As a result, the life of the battery is shortened by the causes such as a deterioration in the performance of the electrode, a rise in the internal resistance of the battery and a deterioration in the nonaqueous electrolyte. Monoclinic titanium dioxide expresses high in-water solid acidity, particularly, when trace of water exists. Water can be contaminated in the battery in a step of producing the raw material and in a step of fabricating the battery and it is therefore difficult to completely remove the water chemically, from the viewpoint of the properties of the raw material and from the viewpoint of cost.

In this embodiment, the inventors have succeeded in improving the cycle life performance by deactivating the solid acid point of monoclinic titanium dioxide.

The negative electrode active material, method for manufacturing the negative electrode active material and nonaqueous electrolyte battery and battery pack using the negative electrode active material according to the embodiments will be explained with reference to the drawings. The structures common between these embodiments are designated by the same reference numerals and duplicated explanations will be omitted. Further, in this case, each of these drawings is a typical view for explanations and promotion of the understanding of the embodiments. Though there are parts different from an actual battery in shape, dimension and ratio, these structural designs may be properly changed taking the following explanations and known technologies into consideration.

(First Embodiment)

The negative electrode active material comprises a titanium oxide compound having a crystal structure of monoclinic titanium dioxide. The titanium oxide compound is characterized in that it is modified by at least one kind of ion selected from the group consisting of an alkali metal cation, alkali earth metal cation, transition metal cation, sulfide ion, sulfuric acid ion and chloride ion.

Here, the monoclinic titanium dioxide is referred to as "$TiO_2(B)$". Though the crystal structure of $TiO_2(B)$ will change because a distortion arises depending on the quantity and kind of intercalation, it belongs primarily to the space group C2/m and has a tunnel structure as shown in FIG. 1. The detailed crystal structure of $TiO_2(B)$ are those described in R. Marchand, L. Brohan, M. Tournoux, Material Research Bulletin 15, 1129 (1980).

FIG. 1 is a schematic diagram of the crystal structure of $TiO_2(B)$. A titanium ion 8 and an oxide ion 9 form a skeleton structure part 10a. The skeleton structure parts 10a are linked and connected with each other. A void part 10b exists between the skeleton structure parts 10a. This void part 10b can work as a host site for intercalation (or insertion) of hetero atoms.

$TiO_2(B)$ is said to have host sites which hetero atoms can be inserted to and released from also on the surface of its crystal. Lithium ions are inserted into and released from these host sites, enabling lithium ions to be inserted to and released from $TiO_2(B)$ reversibly.

When lithium ions are inserted into the void parts 10b, $Ti^{4+}$ forming the skeleton is reduced to $Ti^{3+}$ and the electric neutrality of the crystal is thereby kept. Because $TiO_2(B)$ has one $Ti^{4+}$ per chemical formula, a maximum of one lithium ion can be inserted between layers in theory. For this, titanium oxide compounds having the crystal structure of $TiO_2(B)$ may be represented by the formula $Li_xTiO_2$ ($0 \le x \le 1$). This can have a theoretical value close to two times that of the titanium oxide having an anatase structure.

The titanium oxide compound having such a crystal structure of $TiO_2(B)$ exhibits solid acidity in terms of a pH of 1 or more and less than 7 in water. The inventors have found that a deterioration in cycle life performance can be decreased by modifying a titanium oxide compound having a crystal structure of $TiO_2(B)$ to thereby deactivate the solid acid point (namely, catalyst active point).

The surface of the titanium oxide compound comprised in the negative electrode active material according to this embodiment is modified by ions, so that the catalytic activity of the titanium oxide compound is deactivated. The treatment using ions to modify the surface of the titanium oxide compound means that the modifying element is bound with or substituted for the solid acid point on the surface thereof. These ions used for the modification are chemically bound with the surface of the titanium oxide compound in some state and do not exist independently. The solid acid point which is bound or substituted with a modifying element is deactivated. The modifying element includes ions to modify the titanium oxide compound and element comprised in the ions.

In this case, all solid acid points on the surface of the titanium oxide compound having a crystal structure of $TiO_2(B)$ are not necessarily deactivated but at least a part of solid acid points may be deactivated.

The modifying element existing on the surface of the modified titanium oxide compound may be an element selected from Li, Na, K, Mg, Ca, Mn, Co, Cu, S and Cl or a substituent such as a sulfonic group.

The ions used for the modification is selected from the group consisting of alkali metal cations, alkali earth metal cations, transition metal cations, sulfide ions, sulfuric acid ions and chloride ions. One kind of ion may be used or a plurality of kinds may be used. The ions used for the modification are more preferably alkali metal cations or sulfide ions.

The alkali metal cation is selected preferably from the group consisting of ions of a Li element, Na element and K element and more preferably from the group consisting of $Li^+$, $Na^+$ and $K^+$. The alkali earth metal cation is selected preferably from the group consisting of ions of a Mg element and Ca element and more preferably from the group consisting of $Mg^{2+}$ and $Ca^{2+}$. The transition metal cation is selected preferably from the group consisting of ions of a Mn element, Co element and Cu element and more preferably from the group consisting of $Mn^{3+}$, $Co^{2+}$ and $Cu^{2+}$.

The above modifying elements are preferable because they have high stability and have no influence on charge and discharge and also on the positive electrode.

Although, the existential state and amount of the modifying element are not limited particularly, the modifying element preferably exists on the surface of the titanium oxide compound to deactivate the solid acid points.

The surface of the titanium oxide compound may be analyzed by X-ray photoelectron spectroscopy (XPS). In XPS, the surface of a sample is irradiated with soft X-rays under ultrahigh vacuum to detect photoelectrons emitted from the surface. XPS is an effective means of finding the state of the surface of a material, since photoelectrons can move only several nm through a material. In XPS, the information of an element of the surface can be obtained from the bond energy value of a bound electron in the material, the information concerning the number of valences and bond states can be obtained from the energy shift of each peak, and also, quantitative analysis can be made from each peak area.

The elemental composition ratio of oxygen O to the modifying element X represented by X/O, excluding a carbon element existing as the conductive agent, is preferably in a range from 0.01 to 1, when the electrode is measured by XPS. The X is an atomic percent of an element constituting said at least one kind of ion. The O is an atomic percent of oxygen.

When the elemental composition ratio is 0.01 or more, the effect of modifying the solid acid point on the surface can be obtained. Further, when the elemental composition ratio is 1 or less, the release and insertion of Li ions are not inhibited and the charge/discharge performance is not affected. In this case, oxygen may be one constituting the titanium oxide compound.

The XPS measurement is made under the following condition. 1486.6 eV monochromatic Al K$\alpha_{1,2}$ rays are used as the exciting X-rays, the diameter of the X-rays is 200 μm and photoelectron escape angle (that is, the inclination of the detector with the surface of the sample) is 45 degrees. As a method of analyzing data, 9-point smoothing is carried out and Ti2p is set to 458.2 eV for the correction of the abscissa.

When the modifying element is Li, the electrode which is perfectly discharged and put into the condition free of movable Li is measured.

The modified titanium oxide compound having a crystal structure of $TiO_2(B)$ in this embodiment is less reactive with the nonaqueous electrolyte because its solid acid point is deactivated. Therefore, a battery using such a titanium oxide compound as the active material is decreased in the deterioration of performance, so that it has good cycle life performance. Further, since the solid acid point is deactivated, irreversible capacity is reduced, leading to an improvement in first cycle charge/discharge efficiency.

In this embodiment, 2 g of a $TiO_2(B)$ powder is added in 100 g of distilled water at 25° C., the mixture is stirred for 5 minutes and then, the pH of the solution is measured. The pH value measured at this time is defined as in-water solid acidity.

Further, in this embodiment, the above titanium oxide compound preferably has the characteristics that the aspect ratio is in a range from 1 to 50, the length in the direction of the short axis is in a range from 0.1 to 50 μm and the length in the direction of the long axis is in a range from 0.1 to 200 μm.

The aspect ratio, and the lengths in the directions of the short and long axes may be changed according to the battery characteristics to be required. When, for example, rapid charge and discharge is required, the lengths in the directions of the short and long axes may be respectively designed to be about 0.1 μm when the aspect ratio is set to 1. A titanium oxide compound like this is advantageous in rapid charge and discharge because the diffusion distance of Li ions in a solid is short. When the aspect ratio is small, the contact area with the electrolyte is increased, so that the reaction with the electrolyte is promoted and therefore, the effect of the embodiment is developed more efficiently.

When, a high capacity is required, on the other hand, it is preferable that the aspect ratio is 10 or more, the length in the direction of the short axis is about 5 μm and the length in the direction of the long axis is about 50 to about 200 μm. In such a titanium oxide compound, the plane perpendicular to the direction of the short axis, that is, the (001) plane which is the oriented plane can be increased by pressing in the process of producing the electrode. The (001) plane of $TiO_2(B)$ is one allowing Li ions to be easily inserted thereinto or released therefrom. Therefore, an electrode having many crystal planes advantageous in the absorption and release of Li ions can be produced.

When each length of the long and short axes is 0.1 μm or more, the contact area with the nonaqueous electrolyte is not increased excessively and also, good crystallinity is obtained. When the long axis is 200 μm or less, the dispersibility of the titanium oxide compound in a solvent is good and the slurry used to produce the electrode is stabilized.

The lengths of the particle in the direction of the long and short axes can be directly observed by an electron microscope. The average length of the particle can be measured by the grain distribution obtained by the small-angle X-ray diffraction analysis and laser diffraction method.

In this embodiment, the BET specific surface area of the titanium oxide compound is, without limitation, preferably 5 to 100 $m^2/g$. When the specific surface area is 5 $m^2/g$ or more, the contact area with the nonaqueous electrolyte can be secured. When the specific surface area is 100 $m^2/g$ or less, on the other hand, the reactivity with the nonaqueous electrolyte is not too high and the cycle life characteristics can be improved. Further, in the process of producing an electrode, the slurry is easily applied.

The specific surface area of the sample is determined by a method using a molecule of which the adsorption occupying area is known. In the method, the molecule is made to adsorb to the surface of the powder particle at the temperature of liquid nitrogen, and the specific surface area of the sample is determined from the amount of the adsorbed molecule. A method that is most frequently used to determine the specific surface area is the BET method utilizing low-temperature and low-humidity physical adsorption of inert gas. This method is based on the most famous theory obtained by extending the Langmuir theory for monomolecular layer absorption to multilayer adsorption as the method for calculating specific surface area. The specific surface area calculated is referred to as "BET specific surface area".

(Second Embodiment)

A method for manufacturing the titanium oxide compound comprised in the negative electrode active material according to the first embodiment will be explained in detail below.

The production method according to this embodiment includes a step of reacting an alkali titanate compound with an acid to exchange an alkali cation for a proton, thereby obtaining a proton-exchanged sample, a step of heating the proton-exchanged sample to produce a titanium oxide compound having a crystal structure of monoclinic titanium dioxide and a step of modifying the above titanium oxide compound by using a compound comprising at least one kind of ion selected from the group consisting of an alkali metal cation, alkali earth metal cation, transition metal cation, sulfide ion, sulfuric acid ion and chloride ion.

As the alkali titanate compound, without limitation, a compound such as $Na_2Ti_3O_7$, $K_2Ti_4O_9$ and $Cs_2Ti_5O_{12}$ may be used. These alkali titanate compounds can be obtained by the solid phase reaction method in which a raw material oxide or carbonate is mixed in a predetermined stoichiometric ratio and heated. The alkali titanate compound which has any crystal shape may be used. Further, the alkali titanate compound is not limited to a compound synthesized by the above method. A commercially available one may be used as the alkali titanate compound.

First, the alkali titanate compound is thoroughly washed with distilled water to remove impurities. Thereafter, the alkali titanate compound is reacted with the acid to exchange the alkali cation of the alkali titanate compound for a proton, thereby obtaining a proton-exchanged sample. In alkali titanate compounds such as sodium titanate, potassium titanate and cesium titanate, the alkali cation can be exchanged for a proton without any deformation of a crystal structure by treating them by an acid. For the proton exchange, an acid such as hydrochloric acid, nitric acid and sulfuric acid having a concentration of 0.5 to 2 M may be used.

The acid treatment can be carried out by adding an acid to a powder of an alkali titanate compound, followed by stirring. The acid treatment is preferably continued until alkali cations are sufficiently exchanged with protons. When alkali cations such as potassium and sodium are left unremoved in the proton-exchanged sample, this is a cause of reduced charge-discharge capacity. It is therefore preferable that almost all alkali cations are exchanged for protons.

Without limitation, the acid treatment is preferably carried out for 24 hours or more when the temperature is close to ambient temperature (25° C.) and hydrochloric acid having a concentration of about 1 M is used. The acid treatment is preferably continued for one to two weeks. Moreover, it is preferable to replace the acid solution with a new one every 24 hours.

After the proton exchange is finished, an alkaline solution such as an aqueous lithium hydroxide solution is optionally added to neutralize the remaining acid. The obtained proton-exchanged sample is washed with distilled water and then dried. The proton-exchanged sample is sufficiently washed until the pH of the washed water falls in a range from 6 to 8.

Then, the proton-exchanged sample is heat-treated to obtain a titanium oxide compound having a crystal structure of $TiO_2(B)$. The heat treatment is preferably carried out by annealing. The annealing temperature is preferably in a range from 300 to 500° C., though it is determined properly depending on the proton-exchanged sample because the optimum temperature differs depending on the conditions, such as the composition and particle diameter and crystal form of the proton-exchanged sample. When the temperature is 300° C. or more, high crystallinity is obtained and also, excellent electrode capacity, charge-discharge efficiency and cycle characteristics are obtained. When the temperature is 500° C. or less, on the other hand, a reduction in electrode performance can be prevented because the production of titanium dioxide having an anatase structure which is an impurity phase is restrained. When the annealing temperature is in a range from 350 to 400° C., the obtained titanium oxide compound has a higher capacity and this temperature range is preferable. Though the heating time may be in a range from 2 to 3 hours, it is not limited to this range.

Then, the obtained titanium oxide compound is modified by using a compound comprising at least one kind of ion selected from the group consisting of metal cations such as alkali metal cations (for example, $Li^+$, $Na^+$ and $K^+$), alkali earth metal cations (for example, $Mg^{2+}$ and $Ca^{2+}$) and transition metal cations (for example, $Mn^{3+}$, $Co^{2+}$ and $Cu^{2+}$), sulfide ions ($S^{2-}$), sulfuric acid ions ($SO_4^{2-}$) and chloride ions ($Cl^-$) to thereby deactivate the solid acid point present on the surface of the titanium oxide compound.

The modification can be accomplished by adding an inorganic compound comprising the above ions to a powder of a titanium oxide compound. For example, the modification is carried out by the following process. First, a water-soluble inorganic compound comprising the above ions is dissolved in distilled water, and the titanium oxide compound is dispersed in the solution. Then, the dispersion solution is subjected to filtration to separate a solid, which is washed with water and dried. A titanium oxide compound in which solid acid points are deactivated (hereinafter referred to as "modified titanium oxide compound") can be obtained by such treatment. The modifying element is bound with or substituted for the solid acid point of the modified titanium oxide compound and is not released even by washing with water.

As the water-soluble inorganic compound comprising the above ions, compounds such as hydroxides, chlorides, acetates and sulfates may be used. For example, compounds such as lithium hydroxide, sodium chloride, potassium chloride, magnesium chloride, calcium chloride, manganese acetate, cobalt acetate and copper sulfate are used. The concentration of the aqueous solution is preferably about 0.5 to 1 mol/L, but it is not limited to this range.

When a sulfuric acid ion, sulfide ion or chloride ion is used for the modification, the titanium oxide compound is dispersed in an aqueous sulfuric acid or hydrochloric acid solution and then, washed with water and dried. The solid acid point of the titanium oxide compound can be thereby deactivated. Alternatively, the same effect can be also obtained by using sulfuric acid or hydrochloric acid in the proton exchange treatment and by lowering the level of washing with water in the washing step after the proton exchange to thereby leave sulfide ions, sulfuric acid ions or chloride ions when synthesizing the titanium oxide compound having a crystal structure of $TiO_2(B)$.

Further, in other preferred embodiment, the modification may be carried out in the production of an electrode which will be explained later. In this case, a compound comprising ions of the modifying element is added to a paste prepared by dispersing an active material, conductive agent and binder in an appropriate solvent. The compound preferably comprises oxy metal anions comprises a transition metal, fluoro-metal anions comprises an alkali metal, silicate or phosphate, in consideration of affinity to a solvent. Examples of the solvent include N-methyl-pyrrolidone. Examples of the oxy metal anions include copper oxychloride. Examples of the fluoro-metal anions include lithium tetrafluoroborate.

The paste obtained in this manner is applied to a metal foil to be used as the current collector, thereby making it possible to form an electrode comprising a modified titanium oxide compound in which the solid acid points are deactivated. The amount of the modifying element to be added is preferably hundreds of atomic ppm or more and several atomic % or less based on the titanium element. The amount varies depending on the specific surface area and catalytic ability of the titanium oxide compound and amount of water to be contaminated. The molar fractions of titanium and modifying element in the paste can be measured by induction coupling plasma emission spectral analysis (ICP emission spectral analysis).

(Third Embodiment)

A nonaqueous electrolyte battery according to a includes a positive electrode, a negative electrode comprising a negative electrode active material according to the first embodiment, a nonaqueous electrolyte, a separator and a container.

The positive electrode, negative electrode, nonaqueous electrolyte, separator and container will be explained in detail below.

1) Positive Electrode

The positive electrode comprises a current collector and a positive electrode active material-containing layer (namely, positive electrode layer). The positive electrode layer comprises an active material and a binder. The positive electrode layer is formed on one or both surfaces of the current collector.

As the active material, for example, an oxide, sulfide or polymer may be used. Examples of the active material include manganese dioxide ($MnO_2$) which lithium can be inserted to, iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-cobalt composite oxide (for example, $Li_xMn_yCO_{1-y}O_2$), lithium-manganese-nickel composite oxide having a spinel structure (for example, $Li_xMn_{2-y}Ni_yO_4$), lithium-phosphorous oxide having an olivine structure (for example, $Li_xFePO_4$, $Li_xFe_{1-y}Mn_yPO_4$ and $Li_xCoPO_4$), iron sulfate [$Fe_2(SO_4)_3$], vanadium oxide (for example, $V_2O_5$) and lithium-nickel-cobalt-manganese composite oxide. Here, $0<x\leq1$ and $0<y\leq1$.

As the polymer, for example, conductive polymer materials such as a polyaniline and polypyrrole or disulfide polymer materials may be used. Sulfur (S) or fluorocarbon may also be used as the active material.

Preferable examples of the active material include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($LiNi_{1-y}CO_yO_2$), lithium-manganese-nickel composite oxide having a spinel structure ($Li_xMn_{2-y}Ni_yO_4$), lithium-manganese-cobalt composite oxide ($Li_xMn_yCO_{1-y}O_2$), Lithium-iron phosphate ($LixFePO_4$) and lithium-nickel-cobalt-manganese composite oxide. These examples give a high positive electrode potential. Here, $0<x\leq1$ and $0<y\leq1$.

Particularly, at least one selected form the group consisting of lithium-iron phosphate, $Li_xVPO_4F$, lithium-manganese composite oxide, lithium-nickel composite oxide and lithium-nickel-cobalt composite oxide are preferably used from the viewpoint of cycle life when a nonaqueous electrolyte comprising an ionic liquid is used. This is because the use of these oxides brings about less reactivity between the positive electrode material and the ionic liquid.

The specific surface area of the active material is preferably 0.1 m²/g or more and 10 m²/g or less. The positive electrode active material having a specific surface area of 0.1 m²/g or more can secure sites for lithium ion-absorption and release sufficiently. The positive electrode active material having a specific surface area of 10 m²/g or less is easily handled in industrial production and can ensure good charge-discharge cycle performance.

The binder binds the active material with the current collector. Examples of the binder include a polytetrafluoroethylene (PTFE), polyvinylidene fluoride (PVdF) and fluoro-based rubber.

The conductive agent may be contained in the positive electrode to improve the current collecting ability and to reduce the contact resistance between the active material and the current collector. Examples of the conductive agent include carbonaceous materials such as acetylene black, carbon black and graphite.

In the positive electrode layer, the active material and binder are preferably formulated in a ratio of 80% by weight or more and 98% by weight or less and in a ratio of 2% by weight or more and 20% by weight or less respectively.

When the amount of the binder is 2% by weight or more, satisfactory electrode strength is obtained. Further, when the amount of the binder is 20% by weight or less, the amount of the insulating material of the electrode can be reduced, leading to reduced internal resistance.

When the conductive agent is added, the active material, binder and conductive agent are added in amounts of 77% by weight or more and 95% by weight or less, 2% by weight or more and 20% by weight or less and 3% by weight or more and 15% by weight or less respectively. The conductive agent can exhibit the aforementioned effect when it is formulated in an amount of 3% by weight or more. Further, when the amount of the conductive agent is 15% by weight or less, the decomposition of the nonaqueous electrolyte on the surface of the positive electrode conductive agent during storage at high temperatures can be reduced.

The current collector is preferably an aluminum foil or an aluminum alloy foil comprising elements such as Mg, Ti, Zn, Ni, Cr, Mn, Fe, Cu and Si.

The thickness of the aluminum foil or aluminum alloy foil is desirably 5 μm or more and 20 μm or less and more preferably 15 μm or less. The purity of the aluminum foil is preferably 99% by weight or more. The content of transition metals such as iron, copper, nickel and chromium comprised in the aluminum foil or aluminum alloy foil is preferably designed to be 1% by weight or less.

The positive electrode can be manufactured by suspending, for example, the active material and binder, and optionally the conductive agent, in an appropriate solvent to prepare a slurry, by applying this slurry to the surface of the positive electrode current collector and by drying the slurry, to form a positive electrode layer, which is then pressed. The positive electrode may also be manufactured by forming a pellet comprising the active material and binder and optionally the conductive agent to produce a positive electrode layer, which is then placed on the current collector.

2) Negative Electrode

The negative electrode comprises a current collector and a negative electrode layer (negative electrode active material-containing layer). The negative electrode layer comprises an active material, a conductive agent and a binder. The negative electrode layer is formed on one or both surfaces of the current collector.

The active material is an active material for a battery which comprises the titanium oxide compound explained in the first embodiment. The titanium oxide compound has a crystal structure of a monoclinic titanium dioxide and is modified by using at least one kind of ion selected from the group consisting of an alkali metal cation, alkali earth metal cation, transition metal cation, sulfide ion, sulfuric acid ion and chloride ion. Further, the titanium oxide compound preferably has the aspect ratio is in a range from 1 to 50, the length in the direction of the short axis is in a range from 0.1 to 50 μm and the length in the direction of the long axis is in a range from 0.1 to 200 μm.

Such a titanium oxide compound is less reactive to the nonaqueous electrolyte because its solid acid point is deactivated. Therefore, the nonaqueous electrolyte battery according to this embodiment using such a titanium oxide compound as the active material is decreased in the deterioration of performance and has excellent cycle life performance.

Although the active materials according to the first embodiment may be used solely as the active material, these active materials may be combined with other active materials upon use. As these other active materials, titanium dioxide having an anatase structure, lithium titanate having a rhamsdelite structure or lithium titanate having a spinel structure may be used. These titanium oxide compounds each have a specific gravity close to the titanium oxide compound comprised in the active material according to the first embodiment and are each easily mixed and dispersed. Therefore, these compounds can be preferably used.

The conductive agent improves the current collective performance of the active material and reduces the contact resistance with the current collector. Examples of the conductive agent include carbonaceous materials such as acetylene black, carbon black and graphite.

The binder may be contained in the negative electrode to fill the gap between the dispersed negative electrode active materials and binds the active material with the conductive agent. Examples of the binder include a polytetrafluoroethylene (PTFE), polyvinylidene fluoride (PVdF), fluoro-based rubber and styrene-butadiene rubber.

The active material, conductive agent and binder in the negative electrode layer are preferably formulated in ratios of 68% by weight or more and 96% by weight or less, 2% by weight or more and 30% by weight or less and 2% by weight or more and 30% by weight or less, respectively. When the amount of the conductive agent is 2% by weight or more, the current collective performance of the negative electrode layer is good. Further, when the amount of the binder is 2% by weight or more, the binding characteristic between the negative electrode layer and the current collector is satisfactory and excellent cycle characteristics can be expected. On the other hand, the amount of the binder is preferably 30% by weight or less to develop a nonaqueous electrolyte battery having a higher capacity.

For the current collector, materials which are electrochemically stable at the lithium absorption and release potential of the negative electrode active material are used. The current collector is preferably made of copper, nickel, stainless or aluminum or an aluminum alloy comprising elements such as Mg, Ti, Zn, Mn, Fe, Cu and Si. The thickness of the current collector is preferably 5 to 20 µm. A current collector having such a thickness can keep the balance between the strength of the negative electrode and light-weight characteristics.

The negative electrode can be manufactured by suspending, for example, the active material, conductive agent and binder in a usual solvent to prepare a slurry, by applying this slurry to the surface of the current collector and by drying the slurry, to form a negative electrode layer, which is then pressed. The negative electrode may also be manufactured by forming a pellet comprising the active material, conductive agent and binder to produce a negative electrode layer, which is then placed on the current collector.

3) Nonaqueous Electrolyte

The nonaqueous electrolyte may be a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving the electrolyte in an organic solvent in a concentration of 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably one which is resistant to oxidizing even at a high potential and $LiPF_6$ is most preferable.

Examples of the organic solvent include propylene carbonate (PC), ethylene carbonate (EC) and cyclic carbonates such as vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either solely or in combinations of two or more.

Examples of the polymer material include a polyvinylidene fluoride (PVdF), polyacrylonitrile (PAN) and polyethylene oxide (PEO).

Alternatively, an ionic liquid comprising lithium ions, polymer solid electrolyte, inorganic solid electrolyte and the like may be used as the nonaqueous electrolyte.

The ionic liquid means compounds which can exist in a liquid state at normal temperature (15 to 25° C.) among organic salts constituted of combinations of organic cations and anions. The ionic liquids include those which solely exist in a liquid state, those which are put into a liquid state when mixed with an electrolyte and those which are put into a liquid state when dissolved in an organic solvent. The melting point of the ionic liquid used in a nonaqueous electrolyte battery may be 25° C. or less. Further, the organic cation may have a quaternary ammonium skeleton.

The polymer solid electrolyte is prepared by dissolving an electrolyte in a polymer material and by solidifying the mixture.

The inorganic solid electrolyte is a solid material having lithium ion-conductivity.

4) Separator

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making possible to shut off current and can, therefore, improve safety.

5) Container

Examples of a container include a container made of a laminate film having a thickness of 0.5 mm or less and a metal container having a thickness of 1.0 mm or less. The thickness of the laminate film is preferably 0.2 mm or less. The metal container has a thickness of, preferably, 0.5 mm or less and more preferably 0.2 mm or less.

Examples of the shape of the container include a flat type (that is, thin type), angular type, cylinder type, coin type and button type. Examples of the container include, depending on the dimension of the battery, for example, container for small-sized batteries to be mounted on portable electronic devices and container for large-sized batteries to be mounted on, for example, two- to four-wheel vehicles.

A multilayer film obtained by interposing a metal layer between resin layers is used as the laminate film. The metal layer is preferably an aluminum foil or aluminum alloy foil in view of light-weight characteristics. Polymer materials such as a polypropylene (PP), polyethylene (PE), nylon and polyethylene terephthalate (PET) may be used for the resin layer. The laminate film can be molded into the shape of the container by heat sealing.

The metal container may be constituted of aluminum, an aluminum alloy or the like. The aluminum alloy is preferably an alloy comprising elements such as magnesium, zinc and silicon. When transition metals such as iron, copper, nickel and chromium are comprised in the alloy, the content of these transition metals is preferably 1% by weight or less.

This can significantly improve the long-term reliability and heat dissipating characteristics under a high-temperature environment.

Figure 2:
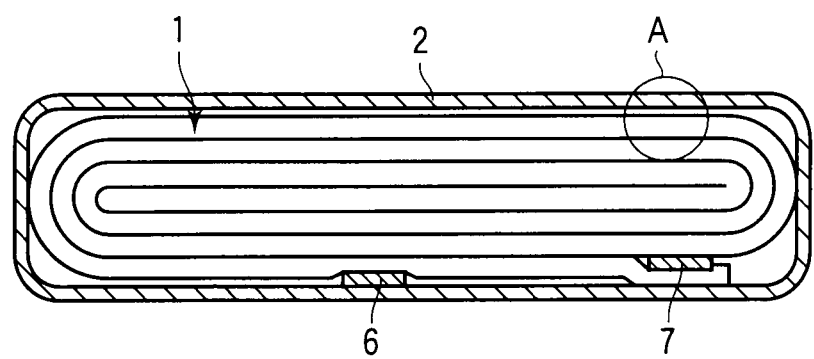
FIG. 2 is a schematic cross section of a flat nonaqueous electrolyte battery of an embodiment.
Figure 3:
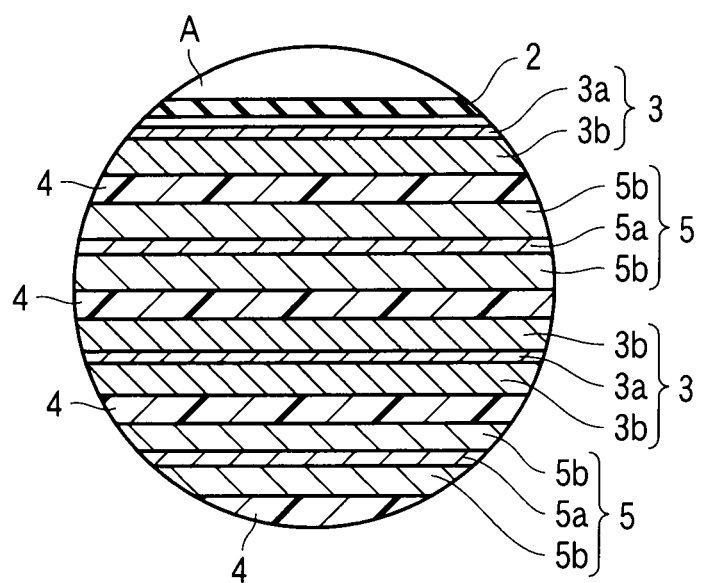
FIG. 3 is a magnified cross section of the A-part of FIG. 2.

Next, the nonaqueous electrolyte battery will be explained in more detail with reference to the drawings. FIG. 2 is a schematic cross section of a flat nonaqueous electrolyte battery. FIG. 3 is a magnified cross section of the A-part of FIG. 2. In this case, each of these drawings is a typical view for explanations and promotion of the understanding of the embodiments. Though there are parts different from an actual device in shape, dimension and ratio, these structural designs may be properly changed taking the following explanations and known technologies into consideration.

A flat coil electrode group 1 is taken in a baggy container 2 made of a laminate film obtained by interposing a metal layer between two resin layers. The flat coil electrode group 1 is formed by spirally coiling a laminate obtained by laminating a negative electrode 3, a separator 4, a positive electrode 5 and a separator 4 in this order from the outside and by press-molding the coiled laminate.

The negative electrode 3 comprises a negative electrode current collector 3a and a negative electrode layer 3b. The negative electrode layer 3b comprises a negative electrode active material according to the first embodiment. The outermost negative electrode 3 has a structure in which as shown in FIG. 3, a negative electrode layer 3b is formed on one inside surface of a negative electrode current collector 3a. Other negative electrodes 3 each has a structure in which a negative electrode layer 3b is formed on each surface of the negative electrode current collector 3a.

The positive electrode 5 has a structure provided with a positive electrode layer 5b on each side of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. These negative electrode terminal 6 and positive electrode terminal 7 are externally extended from an opening part of the baggy container 2. A liquid nonaqueous electrolyte is, for example, injected from the opening part of the baggy container 2. The opening part of the baggy container 2 is closed by heat sealing, extending the negative electrode terminal 6 and positive electrode terminal 7 through the sealing part. Thereby the coil electrode group 1 and liquid nonaqueous electrolyte is sealed in the baggy container 2.

The negative electrode terminal 6 is made of, for example, a material having electrochemical stability at the Li-absorption and release potential of the negative electrode active material and having conductivity. Specifically, the negative electrode terminal 6 is formed of copper, nickel, stainless or aluminum or an aluminum alloy comprising elements such as Mg, Ti, Zn, Mn, Fe, Cu and Si. The negative electrode terminal 6 is preferably made of the same material as the negative electrode current collector to reduce the contact resistance with the negative electrode current collector 3a.

The positive electrode terminal 7 is made of, for example, a material having electrochemical stability in a potential range from 3 to 5 V and preferably 3.0 to 4.25 V with respect to a lithium ion metal and having conductivity. Specific examples of the material for the positive electrode terminal 7 include aluminum and aluminum alloys comprising elements such as Mg, Ti, Zn, Ni, Cr, Mn, Fe, Cu and Si. The positive electrode terminal 7 is preferably made of the same material as the positive electrode current collector 5a to reduce the contact resistance with the positive electrode current collector 5a.

(Fourth Embodiment)

Next, a battery pack will be explained with reference to the drawings. The battery pack comprises one or more of the nonaqueous electrolyte batteries (that is, unit cells) according to the third embodiment. In the case of comprising a plurality of unit cells, these unit cells are arranged such that they are electrically connected in series or in parallel.

Figure 4:
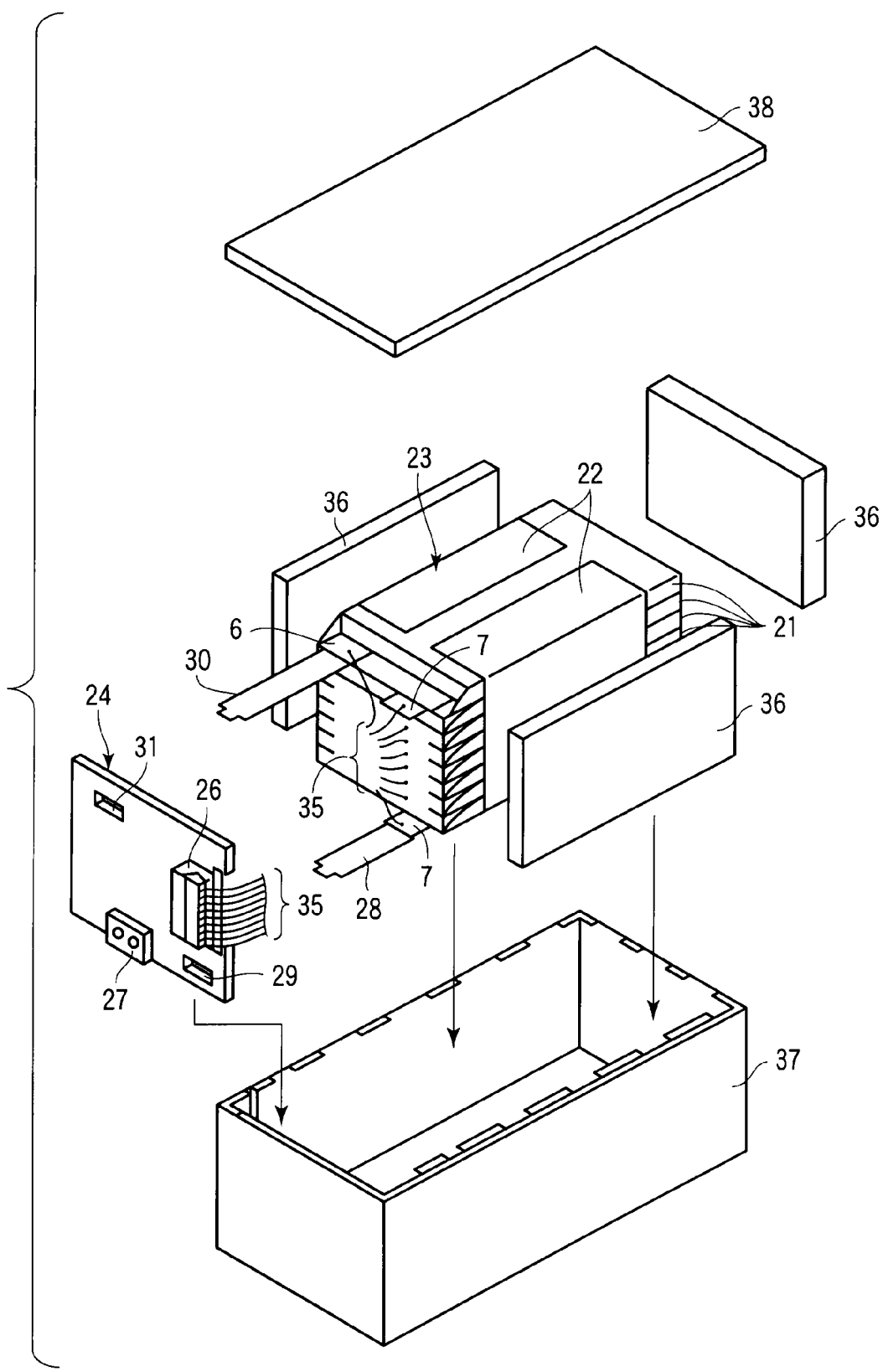
FIG. 4 is an exploded oblique view of a battery pack of an embodiment.
Figure 5:
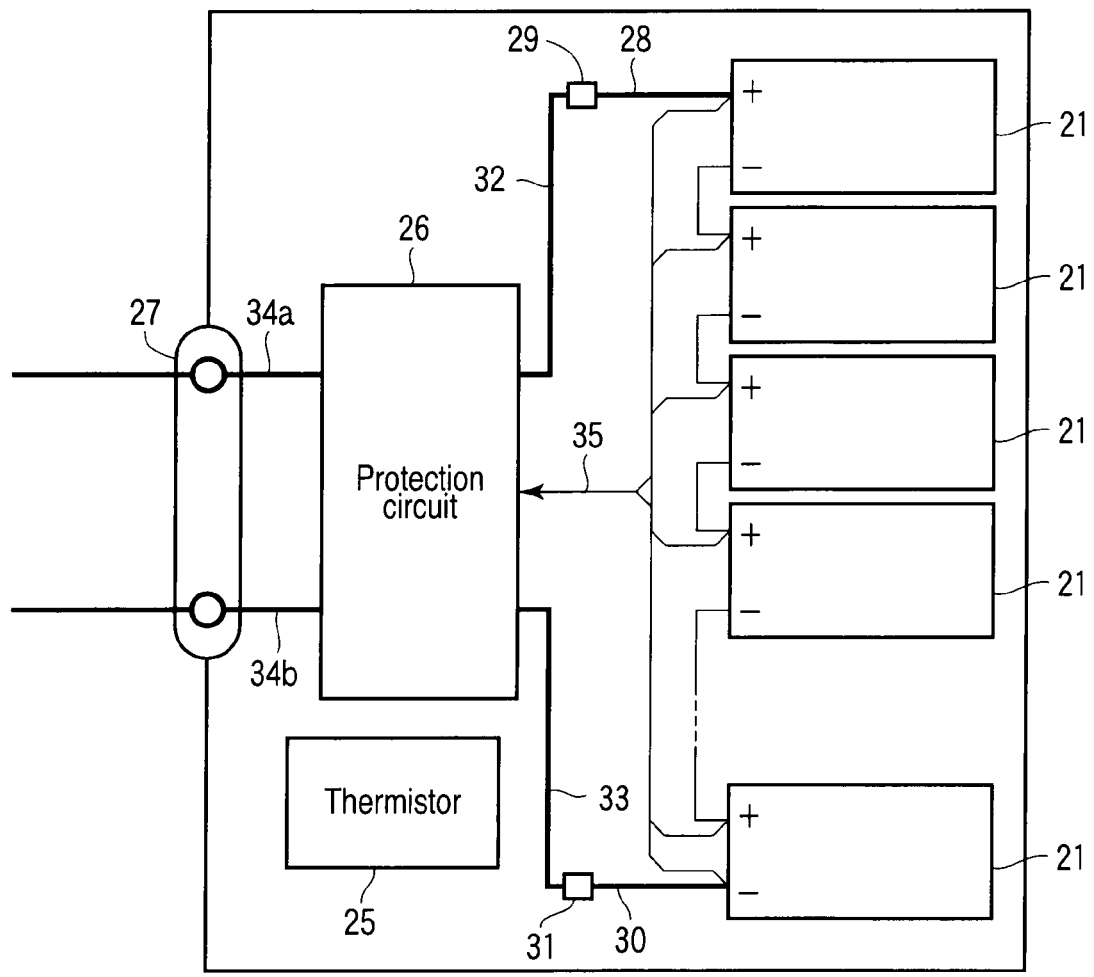
FIG. 5 is a block diagram showing an electric circuit of the battery pack of FIG. 4.

FIGS. 4 and 5 respectively show an example of a battery pack including a plurality of the flat batteries shown in FIG. 2. FIG. 4 is an exploded oblique view of the battery pack. FIG. 5 is a block diagram showing the electric circuit of the battery pack of FIG. 4.

A plurality of unit cells 21 are laminated such that the externally extended negative electrode terminal 6 and positive electrode terminal 7 are arranged in the same direction and fastened with adhesive tape 22 to thereby constitute a battery module 23. These unit cells 21 are electrically connected in series as shown in FIG. 5.

A printed wiring board 24 is disposed opposite to the side surface of the unit cell 21 from which the negative electrode terminal 6 and positive electrode terminal 7 are extended. As shown in FIG. 5, a thermistor 25, a protection circuit 26 and an energizing terminal 27 connected to external devices are mounted on the printed wiring board 24. An insulating plate (not shown) is attached to the surface of the protection circuit substrate 24 facing the battery module 23 to avoid unnecessary connection with the wiring of the battery module 23.

A positive electrode lead 28 is connected to the positive electrode terminal 7 positioned on the lowermost layer of the battery module 23 and the other end of the positive electrode lead 28 is inserted into and electrically connected to a positive electrode connector 29 of the printed wiring board 24. A negative electrode lead 30 is connected to the negative electrode terminal 6 positioned on the uppermost layer of the battery module 23 and the other end of the negative electrode lead 30 is inserted into and electrically connected to a negative electrode connector 31 of the printed wiring board 24. These connectors 29 and 31 are connected to the protection circuit 26 through wirings 32 and 33 formed on the printed wiring board 24.

The thermistor 25 is used to detect the temperature of the unit cell 21 and the detected signals are transmitted to the protection circuit 26. The protection circuit 26 can shut off a positive wiring 34a and negative wiring 34b between the protection circuit 26 and the energizing terminal 27 in a predetermined condition. The predetermined condition means, for example, the case where the temperature detected by the thermistor 25 is a predetermined one or higher. Further, the predetermined condition means, for example, the case of detecting over-charge, over-discharge and over-current of the unit cell 21. The detections of this over-charge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted into individual unit cells 21. In the case of FIGS. 4 and 5, a wiring 35 for detecting voltage is connected to each unit cell 21 and the detected signals are transmitted to the protection circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is taken in a case 37 together with each protective sheet 36 and printed wiring board 24. Specifically, the protective sheet 36 is disposed on each inside surface in the direction of the long side and on one of the inside surfaces in the direction of the short side of the case 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the case 37.

Here, heat-shrink tape may be used in place of the adhesive tape 22 to secure the battery module 23. In this case, after the protective sheet is disposed on both sides of the battery module and the heat-shrink tapes are wound around the battery module, the heat-shrink tape is shrunk by heating to fasten the battery module.

The structure in which the unit cells 21 are connected in series is shown in FIGS. 4 and 5. However, these unit cells may be connected in parallel to increase the capacity of the battery.

Alternatively, these unit cells may be connected by a combination of series-parallel cell connections. The assembled battery packs may be further connected in series or parallel.

Further, the structure of the battery pack is appropriately changed according to its use. The battery pack according to this embodiment is preferably used in applications exhibiting excellent cycle characteristics at a large current. Specific examples of these applications include power sources for digital cameras, and power sources mounted on vehicles such as two- to four-wheel vehicles like hybrid electric cars, electric cars and mopeds. The battery pack is preferably used for power sources mounted on vehicles.

EXAMPLES

The embodiment will be explained in more detail by way of examples. However, the embodiment is not limited to the following examples. The identification of the crystal phase obtained by the reaction and the presumption of the crystal structure obtained by the reaction were made by the powder X-ray diffraction method using Cu—Kα rays, and the specific surface area was measured by the BET method shown in the first embodiment. Further, the composition of the product was analyzed by the ICP method to confirm that the desired material was obtained.

<Synthesis of $TiO_2(B)$>

First, a titanium oxide compound having a crystal structure of $TiO_2(B)$ was synthesized. Commercially available $K_2Ti_4O_9$ was used as starting material. $K_2Ti_4O_9$ powder was washed with distilled water to remove impurities. Then, the obtained powder was added in a 1 M hydrochloric solution, which was then stirred at 25° C. for 72 hours to carry out proton exchange. At this time, the 1 M hydrochloric acid solution was exchanged for a new one every 24 hours.

The suspension solution obtained by the proton exchange had good dispersibility and was scarcely separated by filtration. For this, the suspension solution was centrifuged to separate a solvent from a solid, thereby obtaining a proton titanate compound represented by $H_2Ti_4O_9$. This proton-exchanged sample powder was washed with distilled water until the pH of the washing solution became 6 to 7.

Next, the proton-exchanged sample $H_2Ti_4O_9$ was annealed at 350° C. for 3 hours. In order to obtain an accurate heat history, the proton-exchanged sample was placed in an electric furnace set to a predetermined temperature and taken out of the furnace rapidly after heating, followed by rapid cooling in the air. This annealed body was dried at 80° C. under vacuum for 12 hours to obtain a titanium oxide compound.

Figure 6:
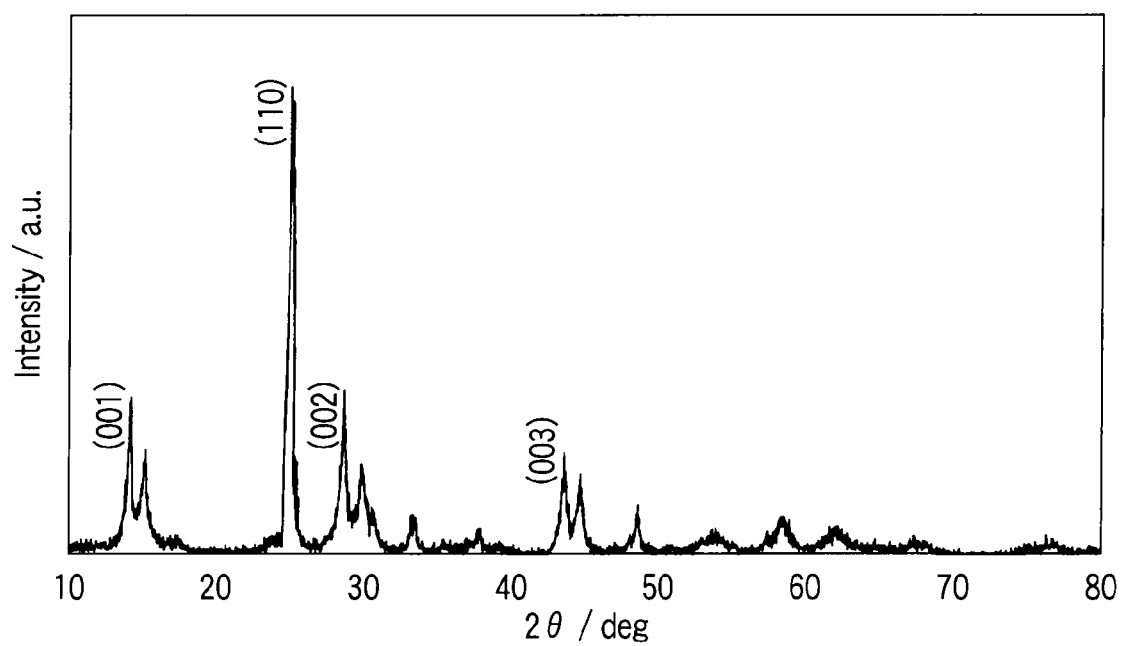
FIG. 6 is a powder X-ray diffraction view of a titanium oxide compound synthesized in an example.

The obtained titanium oxide compound was measured by powder X-ray diffraction using Cu—Kα as the radiation source. The obtained powder X-ray diffraction pattern is shown in FIG. 6. A peak of the (001) plane appeared in the vicinity of 2θ=14 degrees, a peak of the (110) plane appeared in the vicinity of 2θ=25 degrees, a peak of the (002) plane appeared in the vicinity of 2θ=28.5 degrees and a peak of the (003) plane appeared in the vicinity of 2θ=43.5 degrees, to confirm that the synthesized titanium oxide compound had the crystal structure of $TiO_2(B)$.

The measurement of the powder X-ray diffraction is made in the following manner. First, an object sample is milled until the average particle diameter of the sample is decreased to about 5 μm. The average particle diameter can be obtained by the laser diffraction method. The milled sample is filled in a 0.2-mm-deep holder part formed on a glass sample plate. At this time, a care must be taken to fill the sample sufficiently in the holder. Further, a further care must be taken to prevent the occurrence of cracks and voids caused by a lack of the sample to be filled. Then, using a separate glass plate, the glass plate is sufficiently pressed against the sample from the outside to smooth the surface of the sample. In this case, a care must be taken to prevent the generation of parts convexed or concaved from the standard level of the holder. Then, the glass plate in which the sample is filled is set to the powder X-ray diffraction device to obtain a diffraction pattern by using Cu—Kα rays.

In the case where the sample tends to orientate, and for example, specified peak intensity ratio is shifted by 50% or more from the standard peak intensity ratio described in JCPDS card which is the data base of standard minerals in the powder X-ray diffraction pattern, there are the possibilities that the position of a peak is shifted and the intensity ratio is changed depending on the way of filling the sample. A sample like this is pelletized to measure. The pellet may be a green compact having a diameter of 10 mm and a thickness of 2 mm. The green compact may be manufactured by applying about 250 MPa to the sample over 15 minutes. The obtained pellet is set to an X-ray diffraction device to measure the surface of the pellet. The measurement using such a method makes it possible to exclude a difference in the results of measurement between operators, with the result that the reproducibility can be improved.

Example 1-1

The titanium oxide compound which was produced above and had a crystal structure of $TiO_2(B)$ was modified using Li as the modifying element. 1 L of an aqueous 1 M lithium hydroxide solution was prepared, 10 g of titanium oxide compound was added in the solution and the mixture was stirred for one hour. After that, the mixture was subjected to filtration to separate a solid, which was then washed with 5 L of distilled water. Then, the resulting solid was dried at 80° C. under vacuum for 12 hours to obtain a modified titanium oxide compound of Example 1-1.

Example 1-2

A modified titanium oxide compound of Example 1-2 was obtained in the same method as in Example 1-1 except that sodium chloride was used in place of lithium hydroxide to modify the titanium oxide compound using Na as the modifying element.

Example 1-3

A modified titanium oxide compound of Example 1-3 was obtained in the same method as in Example 1-1 except that potassium chloride was used in place of lithium hydroxide to modify the titanium oxide compound using K as the modifying element.

Example 1-4

A modified titanium oxide compound of Example 1-4 was obtained in the same method as in Example 1-1 except that magnesium chloride was used in place of lithium hydroxide to modify the titanium oxide compound using Mg as the modifying element.

Example 1-5

A modified titanium oxide compound of Example 1-5 was obtained in the same method as in Example 1-1 except that calcium chloride was used in place of lithium hydroxide to modify the titanium oxide compound using Ca as the modifying element.

Example 1-6

A modified titanium oxide compound of Example 1-6 was obtained in the same method as in Example 1-1 except that manganese acetate was used in place of lithium hydroxide to modify the titanium oxide compound using Mn as the modifying element.

Example 1-7

A modified titanium oxide compound of Example 1-7 was obtained in the same method as in Example 1-1 except that cobalt acetate was used in place of lithium hydroxide to modify the titanium oxide compound using Co as the modifying element.

Example 1-8

A modified titanium oxide compound of Example 1-8 was obtained in the same method as in Example 1-1 except that copper sulfate was used in place of lithium hydroxide to modify the titanium oxide compound using Cu as the modifying element.

Example 1-9

When synthesizing a titanium oxide compound having a crystal structure of $TiO_2(B)$, commercially available $K_2Ti_4O_9$ was added in a 1 M hydrochloric acid solution, which was then stirred at 25° C. for 72 hours to carry out proton exchange in the same manner as above, and then, the obtained proton-exchanged sample was annealed without washing with water. Thus, the titanium oxide compound modified using chlorine as the modifying element was obtained as a modified titanium oxide compound of Example 1-9.

Example 1-10

The annealing was carried out in the same manner as in Example 1-9 except that sulfuric acid was used in place of hydrochloric acid. Thus, the titanium oxide compound modified using a sulfuric acid ion as the modifying element was obtained as a modified titanium oxide compound of Example 1-10.

<Production of an Electrochemical Measuring Cell of Example 1>

10 wt % of polytetrafluoroethylene as a binder and 20 wt % of acetylene black as a conductive agent was mixed with a powder of each modified titanium compound of Examples 1-1 to 1-10 to form an electrode. A metal lithium foil was used as a counter electrode to this electrode. As the non-aqueous electrolyte, a solution obtained by dissolving 1 M of lithium perchlorate as a salt in a mixed solvent of ethylene carbonate and diethyl carbonate (1:1 by volume) was used. Electrochemical measuring cells of Examples 1-1 to 1-10 were produced using these materials.

Because, in this case, a lithium metal is used as the counter electrode, the electrode potential of the titanium oxide compound is higher than that of the counter electrode. For this, the directions of charge and discharge are reverse to those in the case of using a titanium oxide compound electrode as the negative electrode of a lithium ion battery. Here, in order to avoid confusions, it is so defined that the direction in which lithium ions are inserted into the electrode of the titanium oxide compound is called a charge direction and the direction in which lithium ions are released is called a discharge direction in this embodiment.

Though the electrode using the titanium oxide compound is made to work as the positive electrode as mentioned above, the electrode using the titanium oxide compound can be made to work as the negative electrode by combining the titanium oxide compound with a conventionally known positive electrode material.

Example 2

In Example 2, the titanium oxide compound was modified when the electrode was manufactured.

The titanium oxide compound produced above and having a crystal structure of $TiO_2(B)$, acetylene black and a PVDF binder were blended in a ratio by weight of 70:20:10. This mixture was dispersed in a N-methyl pyrrolidone (NMP) solvent to prepare a paste. $LiBF_4$ was added to this paste. In this case $LiBF_4$ was added in such an amount that the amount of a Li element was 1000 ppm (mol basis) based on a Ti element comprised in the titanium oxide compound. This paste was applied to a metal foil which was to be the electrode current collector to obtain an electrode.

This electrode was used to produce an electrochemical measuring cell of Example 2. A metal lithium foil was used as the counter electrode. As the nonaqueous electrolyte, a solution obtained by dissolving 1 M of lithium perchlorate as a salt in a mixed solvent of ethylene carbonate and diethyl carbonate (1:1 by volume) was used.

Comparative Example

In this Comparative Example, the titanium oxide compound produced above and having a crystal structure of $TiO_2(B)$ was used without modifying it to manufacture an electrode, which was then used to produce an electrochemical measuring cell of Comparative Example. The methods of producing the electrode and measuring cell are the same as those of Example 1.

<Surface Analysis>

Each electrode manufactured using the titanium oxide compounds of Example 1, Example 2 and Comparative Example was examined by the X-ray photoelectron spectral method (XPS). The elemental composition ratio X (atomic %)/O (atomic %) of oxygen O to the modifying element X was calculated. The results are shown in Table 1. It was confirmed that the elemental composition ratios obtained in Examples 1-1 to 1-10 and Example 2 each fell in the range from 0.01 to 1.

<Evaluation of Cycle Discharge Characteristics>

Measuring cells of Examples 1-1 to 1-10, Example 2 and Comparative Example were each subjected to 50-cycle cycle charge-discharge operation to examine the discharge capacity maintenance ratio. In one cycle, one charge and one discharge were carried out. The charge/discharge operations were carried out in the conditions of a potential range from 1.0 to 3.0 V based on metal lithium electrode, discharge current value of 0.05 mA/cm² and ambient temperature. The capacity maintenance ratio was calculated on the premise that the first cycle discharge capacity at the discharge current value of 0.05 mA/cm² was set to 100. Further, the Coulomb efficiency (first cycle charge-discharge efficiency) in the first cycle charge-discharge operation and charge-discharge efficiency just after 50 cycles were finished were measured. These results are shown in Table 1.

TABLE 1

| | Modifying element | Elemental composition ratio X (atomic %)/ O (atomic %) | First cycle discharge capacity mAh/g | First cycle charge-discharge efficiency % | Discharge capacity maintenance ratio after 50 charge-discharge cycles % | Charge-discharge efficiency after 50 charge-discharge cycles % |
|---|---|---|---|---|---|---|
| Example 1-1 | Li | 0.63 | 238 | 90.5 | 96.3 | 99.89 |
| Example 1-2 | Na | 0.21 | 215 | 88.3 | 95.1 | 99.76 |
| Example 1-3 | K | 0.15 | 208 | 87.1 | 93.3 | 99.54 |
| Example 1-4 | Mg | 0.19 | 212 | 84.2 | 94.8 | 99.61 |
| Example 1-5 | Ca | 0.32 | 220 | 86.5 | 95.5 | 99.58 |
| Example 1-6 | Mn | 0.39 | 213 | 85.3 | 97.2 | 99.81 |
| Example 1-7 | Co | 0.45 | 209 | 82.4 | 94.6 | 99.67 |
| Example 1-8 | Cu | 0.51 | 207 | 84.6 | 93.8 | 99.45 |
| Example 1-9 | Cl | 0.12 | 210 | 86.7 | 95.8 | 99.62 |
| Example 1-10 | SO4 | 0.65 | 225 | 83.6 | 97.1 | 99.56 |
| Example 2 | Li | 0.90 | 229 | 88.9 | 94.4 | 99.87 |
| Comparative Example | None | 0.00 | 206 | 70.6 | 67.3 | 99.05 |

As shown in Table 1, Examples 1 and 2 were more improved in discharge capacity maintenance ratio after 50 cycles were finished and charge-discharge efficiency as compared with Comparative Example. It has been shown that a battery is decreased in deterioration, enabling stable charge-discharge by using the modified titanium oxide compound having a crystal structure of $TiO_2(B)$.

Further, Examples 1 and 2 are more improved also in first cycle charge-discharge efficiency as compared with Comparative Example. These results suggest that the irreversible capacity is reduced by deactivating solid acid points by modifying the surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material comprising a titanium oxide compound having a crystal structure of monoclinic system titanium dioxide,
   wherein the titanium oxide compound has solid acid points on a surface thereof;
   at least one kind of ion selected from the group consisting of $Na^+$, $K^+$, $Mg^{2+}$, $Ca^{2+}$, $Cu^{2+}$, $S^{2-}$, $SO_4^{2-}$ and $Cl^-$ exists on the surface of the titanium oxide compound;
   the ion is bound to the solid acid points to make the solid acid points electrochemically inactive.

2. The negative electrode active material according to claim 1, wherein said at least one kind of ion is selected from the group consisting of $Na^+$, $K^+$, and $S^{2-}$.

3. The negative electrode active material according to claim 1, wherein an aspect ratio of the titanium oxide compound is in a range from 1 to 50, a length of the titanium oxide compound in the direction of its short axis is in a range from 0.1 to 50 μm and a length of the titanium oxide compound in the direction of its long axis is in a range from 0.1 to 200 μm.

4. The negative electrode active material according to claim 1, which satisfies the following equation (1):

$$0.01 \leq X/O \leq 1 \quad (1)$$

wherein X is an atomic percent of an element constituting said at least one kind of ion and O is an atomic percent of oxygen.

5. A nonaqueous electrolyte battery comprising:
   a positive electrode which lithium can be inserted to and released from;
   a negative electrode comprising the negative electrode active material as claimed in claim 1; and
   a nonaqueous electrolyte.

6. A battery pack comprising the nonaqueous electrolyte battery as claimed in claim 5.

7. The negative electrode active material according to claim 1, wherein at least a part of the solid acid points on the surface of the titanium oxide compound are deactivated by the at least one kind of ion.

8. The negative electrode active material according to claim 1, wherein said ion does not contribute to charge or discharge of the titanium oxide compound.

9. The negative electrode active material according to claim 1, wherein each of the solid acid points comprises a hydroxyl group, and the ion is bond to the hydroxyl group.

10. The negative electrode active material according to claim 1, wherein the crystal structure belongs to a space group C2/m.

11. The negative electrode active material according to claim 1, wherein a BET specific surface area of the titanium oxide compound is 5 to 100 m²/g.

12. The nonaqueous electrolyte battery according to claim 5, wherein the positive electrode comprises a positive electrode active material, and the positive electrode active material comprises at least one selected from the group consisting of manganese dioxide, iron oxide, copper oxide, nickel oxide, lithium-manganese composite oxide, lithium-nickel composite oxide, lithium-cobalt composite oxide, lithium-nickel-cobalt composite oxide, lithium-manganese-cobalt composite oxide, lithium-manganese-nickel composite oxide having a spinel structure, lithium-phosphorous oxide having an olivine structure, iron sulfate, vanadium oxide and lithium-nickel-cobalt-manganese composite oxide.

13. The nonaqueous electrolyte battery according to claim 5, wherein the nonaqueous electrolyte comprises at least one selected from the group consisting of a liquid nonaqueous electrolyte, a gel-like nonaqueous electrolyte, an ionic liquid, a polymer solid electrolyte, and an inorganic solid electrolyte.

* * * * *